(12) United States Patent
Cromer et al.

(10) Patent No.: US 6,647,497 B1
(45) Date of Patent: Nov. 11, 2003

(54) METHOD AND SYSTEM FOR SECURE COMPUTER SYSTEM TRANSFER

(75) Inventors: Daryl C. Cromer, Apex, NC (US); James P. Ward, Raleigh, NC (US); Howard J. Locker, Cary, NC (US); Richard A. Dayan, Wake Forest, NC (US); Michael J. Steinmetz, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,766

(22) Filed: Mar. 31, 1999

(51) Int. Cl.⁷ ............................. H04L 9/00; H04Q 5/22
(52) U.S. Cl. .................. 713/200; 340/10.1; 340/5.61; 705/28
(58) Field of Search ................. 713/1, 2, 200, 713/201, 202, 300, 310; 340/5.1, 5.2, 5.61, 5.62, 10.1, 10.31, 10.5, 572.1, 572.3, 5.6, 5.63, 5.64, 58; 235/380, 382, 382.5, 375; 705/22, 28, 29

(56) References Cited

U.S. PATENT DOCUMENTS

| 5,712,973 | A | * | 1/1998 | Dayan et al. ............... 713/200 |
|---|---|---|---|---|
| 5,818,345 | A | * | 10/1998 | Sjooquist ............... 340/825.31 |
| 5,831,533 | A | * | 11/1998 | Kanno ..................... 340/5.64 |
| 5,874,896 | A | * | 2/1999 | Lowe et al. ............. 340/572.1 |
| 5,911,777 | A | * | 6/1999 | Heredia .................... 713/200 |
| 5,960,084 | A | * | 9/1999 | Angelo ..................... 380/25 |
| 5,960,085 | A | * | 9/1999 | de la Huerga ................ 380/25 |
| 5,970,227 | A | * | 10/1999 | Dayan et al. ............... 713/200 |
| 6,088,450 | A | * | 7/2000 | Davis et al. ................ 713/182 |
| 6,166,688 | A | * | 12/2000 | Cromer et al. ......... 342/357.17 |
| 6,173,352 | B1 | * | 1/2001 | Moon ........................ 710/129 |
| 6,317,028 | B1 | * | 11/2001 | Valiulis ..................... 340/10.1 |
| 6,357,007 | B1 | * | 3/2002 | Cromer et al. .............. 713/194 |
| 6,418,533 | B2 | * | 7/2002 | Angelo et al. .............. 713/202 |
| 2003/0048174 | A1 | * | 3/2003 | Stevens et al. ............ 340/5.64 |

FOREIGN PATENT DOCUMENTS

| EP | 0899647 A2 | * | 3/1999 | ............. G06F/1/00 |
|---|---|---|---|---|
| EP | 1291748 A2 | * | 3/2003 | ............. G06F/1/00 |
| GB | 1537759 | | 1/1979 | |
| JP | PUPA 06-324972 | | 11/1994 | |
| JP | PUPA 08-272695 | | 10/1996 | |
| JP | PUPA 10-111727 | | 4/1998 | |
| WO | WO 98/13741 | | 4/1998 | |

OTHER PUBLICATIONS

Carbone, "Safety features mean more chips in cars" Sep. 15, 1998, Purchasing, vol. 125, #4, p. 47.*
"Theft–deterrent Device for Electronic Equipment," Research Disclosure, No. 41998, Mar. 1999, pp 398–99.
James F. Blinn, *Compositing, Part 2: Practice*, IEEE Computer Graphics and Applications, Nov. 1994, pp 78–82.
James F. Blinn, *Compositing, Part 1: Theory*, IEEE Computer Graphics and Applications, Sep. 1994, pp 83–87.

* cited by examiner

*Primary Examiner*—Gail Hayes
*Assistant Examiner*—Christopher Revak
(74) *Attorney, Agent, or Firm*—Sawyer Law Group, LLP; Carlos Munoz-Bustamante

(57) ABSTRACT

Method and system aspects for securely transferring a computer system are described. A computer system is disabled at a shipping point via an RFID (radio frequency identification) interface and re-enabled at a receiving point via the RFID interface. Disabling the computer system includes selecting a boot password, writing the boot password to storage in the computer system via the RFID interface, and setting a disable bit in the storage via the, RFID interface. Re-enabling the computer system includes entering the boot password via the RFID interface and clearing the disable bit.

14 Claims, 6 Drawing Sheets

METHOD AND SYSTEM FOR SECURE COMPUTER SYSTEM TRANSFER

FIELD OF THE INVENTION

The present invention relates to computer system security and more particularly to computer system security during transit.

BACKGROUND OF THE INVENTION

Theft of personal computers is a multi-million dollar problem throughout the world. Frequently the thefts of the computers occur during the time from shipment of the computers from manufacturers until they arrive at the desk of the purchaser. A primary reason for the high incidence of theft is the opportunity, since it is well known that merchandise in transit is much easier to steal or lose than merchandise that has been delivered.

Another reason for the high incidence of theft is the lack of security within the computer system itself. The ability to render an asset non-operational is an extremely effective method of deterring theft. However, security mechanisms are normally user-dependent and are thus disabled during shipping and only enabled by a customer at the time of system installation. Therefore, the potential for theft increases for systems in transit, since the systems remain operational.

Accordingly, what is needed is a system and method for securing computer systems during shipping in an efficient and effective manner. The present invention addresses such a need.

SUMMARY OF THE INVENTION

Method and system aspects for securely transferring a computer system are described. A computer system is disabled at a shipping point via an RFID (radio frequency identification) interface and re-enabled at a receiving point via the RFID interface. Disabling the computer'system includes selecting a boot password, writing the boot password to storage in the computer system via the RFID interface, and setting a disable bit in the storage via the RFID interface. Re-enabling the computer system includes entering the boot password via the RFID interface and clearing the disable bit.

Through the present invention, a straightforward and efficient utilization of a radio frequency identifier interface supports the transfer of a disabled computer system from a first site to a second site. The ability to effectively disable a computer system provides more security during transfer, thus reducing the potential for theft. These and other advantages of the aspects of the present invention will be more fully understood in conjunction with the following detailed description and accompanying drawings.

DETAILED DESCRIPTION

The present invention relates to securely transferring computer systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
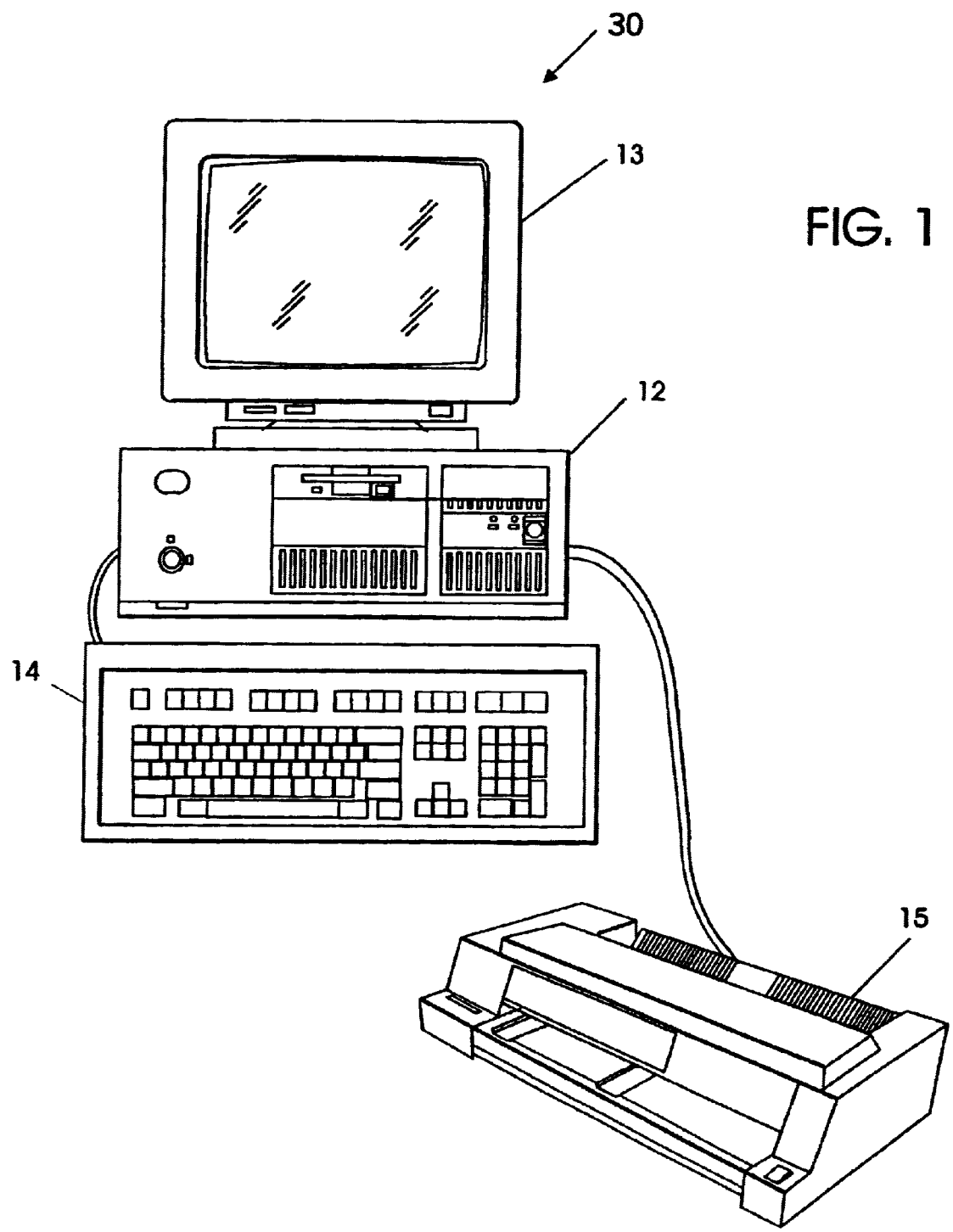
FIG. 1 illustrates a computer system in accordance with the present invention.

FIG. 1 illustrates a pictorial representation of a computer system in accordance with the method and system of the present invention. Computer system 30 includes a computer 12, a monitor 13, a keyboard 14, and a printer or plotter 15.

Figure 2:
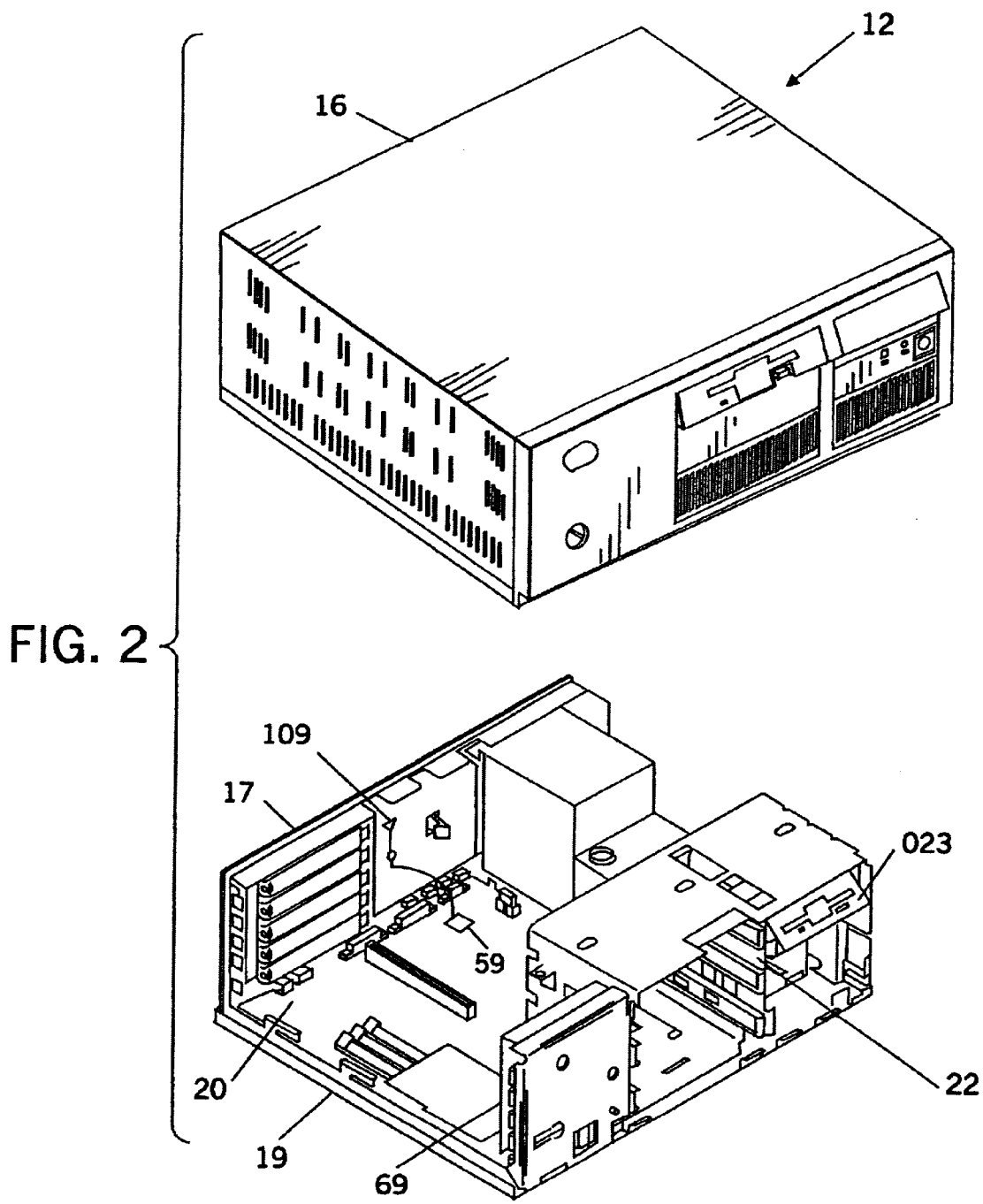
FIG. 2 illustrates an expanded view of the computer of FIG. 1.

FIG. 2 illustrates a pictorial representation of an exploded view of computer 12 in accordance with the method and system of the present invention. Computer 12 has a cover 16 which cooperates with a chassis 19 in defining an enclosed shielded volume for receiving data processing and storage components for processing and storing digital data. At least certain of the system components are mounted on a multi layer planar 20 (also commonly called a motherboard or system board) which is mounted on the chassis 19 and provides a means for mounting and electrically interconnecting various components of computer 12 including the CPU, system memory, and accessory cards or boards as is well known in the art.

Chassis 19 has a base and a rear panel 17 and defines at least one open bay 22 for receiving a data storage device such as a disk drive 23. An antenna 109 is mounted to extend outside computer 12 to collect radiation having a predefined characteristic. Antenna 109 is intended to provide a signal to system 30 via the RFID interface 59 indicating radiation having the predefined characteristic in the vicinity of computer system 30.

Figure 3:
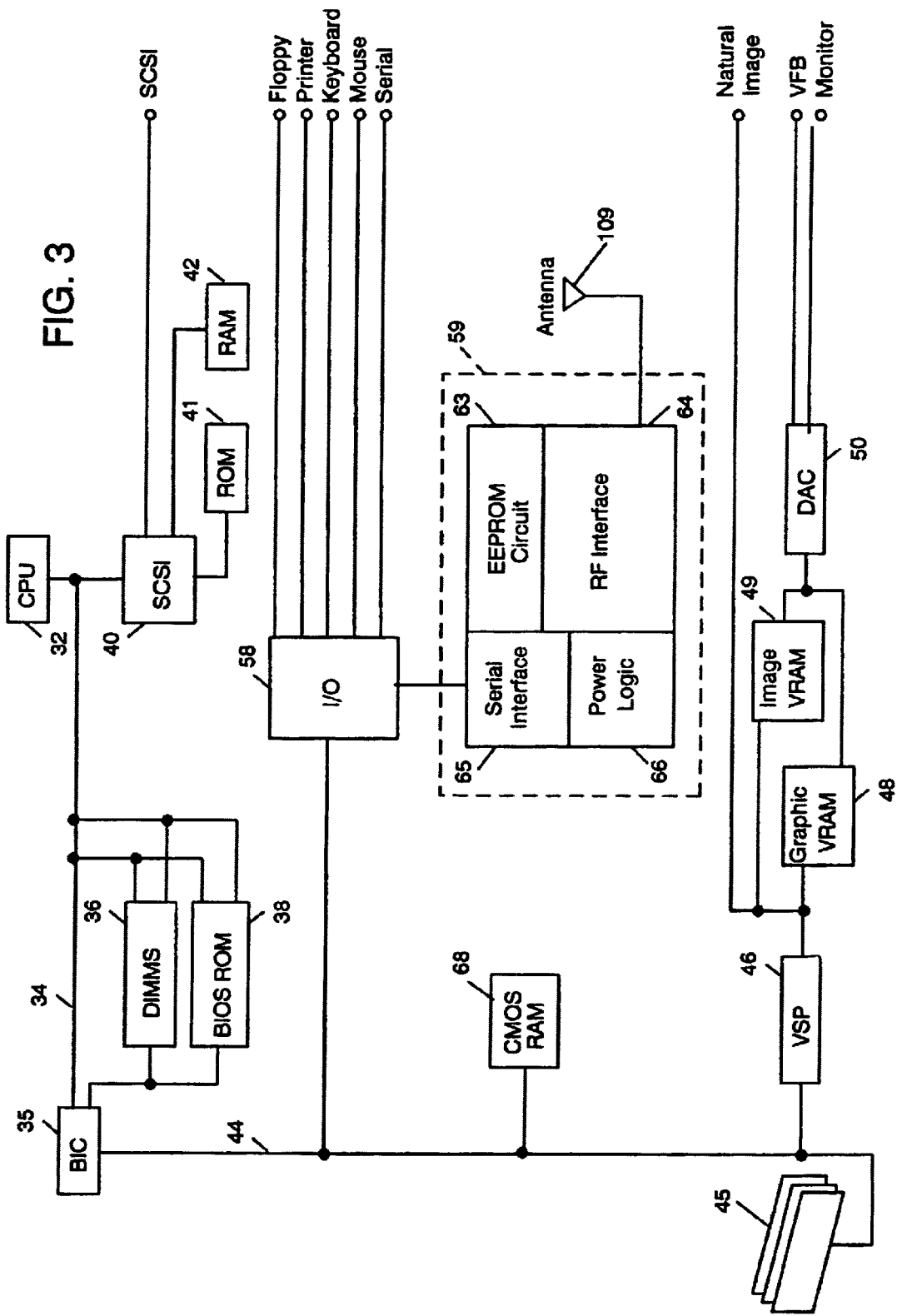
FIG. 3 illustrates a high level block diagram of the computer system of FIG. 1.

FIG. 3 illustrates a high level block diagram of computer system 30 illustrating the various components of computer system 30 in accordance with the method and system of the present invention, including components mounted on the planar 20 and the connection of the planar to the I/O slots and other hardware of the personal computer system. Connected to the planar is the system processor. While any appropriate microprocessor can be used as the CPU 32, one suitable microprocessor is the Pentium which is sold by INTEL. The CPU 32 is connected by a high speed CPU local bus 34 to a bus interface control unit 35, volatile random access memory (RAM) 36 here shown as Dual Inline Memory Modules (DIMMs), and to BIOS ROM 38 in which is stored instructions for basic input/output operations to the CPU 32. The BIOS ROM 38 includes the BIOS that is used to interface between the I/O devices and the operating system of the microprocessor 32 and initialize the system. Instructions stored in the BIOS ROM 38 can be copied into RAM 36 to decrease the execution of BIOS. The system also has, as has become conventional, a circuit component which has battery backed non-volatile memory 68,(conventionally CMOS RAM) for receiving and retaining data regarding the system configuration and a real time clock (RTC).

While the present invention is described hereinafter with particular referenceto the system block diagram of FIG. 3, it is to be understood at the outset of the description which follows that it is contemplated that the apparatus and methods in accordance with the present invention may be used with other hardware configurations of the planar board. For example, the system processor could be an INTEL Pentiun or Pentium II microprocessor.

Referring again to FIG. 3, the CPU local bus 34 (comprising data, address, and control components) also provides for the connection of the microprocessor 32 with a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the figure. The SCSI controller 40 functions as a storage controller in controlling storage memory devices such as fixed or removable media electromagnetic storage devices (also known as hard and floppy disk drives), electro-optical, tape and other storage devices.

Bus interface controller (BIC) 35 couples CPU local bus 34 with an I/O bus 44. By means of bus 44, BIC 35 is coupled with an optional feature bus such as a PCI bus having a plurality of I/O slots for receiving PCI adapter cards 45 which may be further connected to an I/O device or memory (not shown). The I/O bus 44 includes address, data, and control components.

Coupled along, I/O bus 44 are a variety of I/O components such as a video signal processor 46 which is associated with video RAM (VRAM) for storing graphic information 48 and for storing image information 49. Video signals exchanged with the graphics processor 46 may be passed through a Digital to Analog Converter (DAC) 50 to a monitor or other display device. Provision is also made for connecting the output of the graphics processor 46 directly with what is here referred to as a natural image input/output, which may take the form of a video recorder/player, camera, etc.

The I/O bus 44 is coupled utilizing an input/output controller 58 to an associated Electrical Erasable Programmable Read Only Memory (EEPROM) 59. Conventional peripherals, such as floppy disk drives, a printer or plotter 15, keyboard 14 and a mouse or pointing device (not shown), are coupled to I/O bus 44 utilizing I/O controller 58.

EEPROM 59 includes an EEPROM circuit 63, a serial interface 65 for inputting and outputting signals, a radio frequency (RF) interface 64 for receiving wireless signals, and a power management logic circuit 66. The EEPROM 59 provides an integrated RFID (Radio Frequency Identification) interface for PCs and other intelligent electronic devices. This subsystem consists of a dual ported non-volatile memory element with both a digital serial (I2C) and Radio Frequency interfaces. By way of example, such circuitry is available in PC300's from IBM Corporation, Armonk, N.Y. Interaction with the RF interface 64 occurs with an appropriate wireless RF communication device, such as a hand-held device made by PCID.

Figure 4:
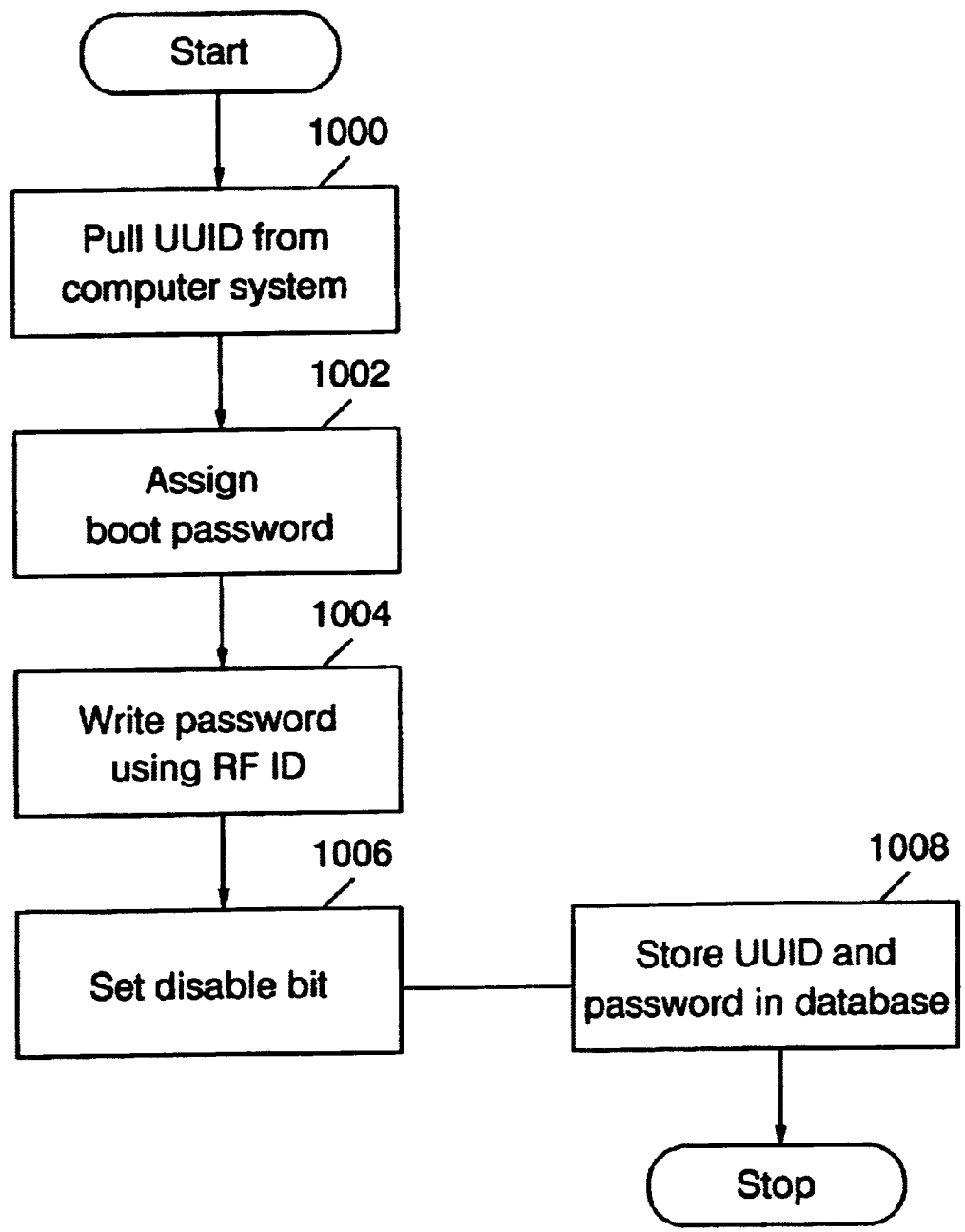
FIGS. 4 and 5 illustrate block flow diagrams of processes for securing the computer system at a shipping site in accordance with the present invention.
Figure 5:
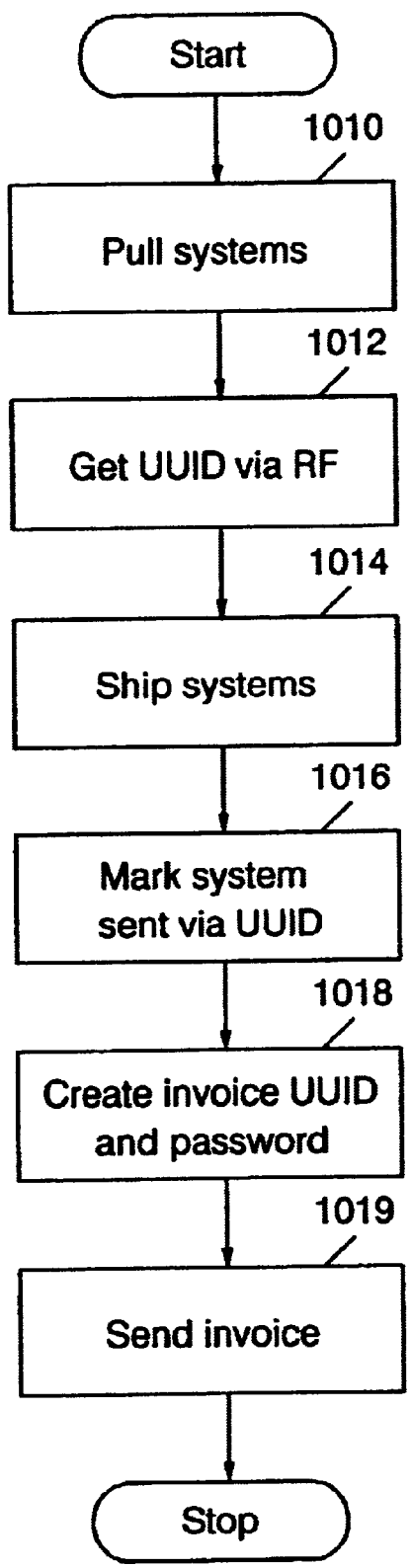
Figure 6:
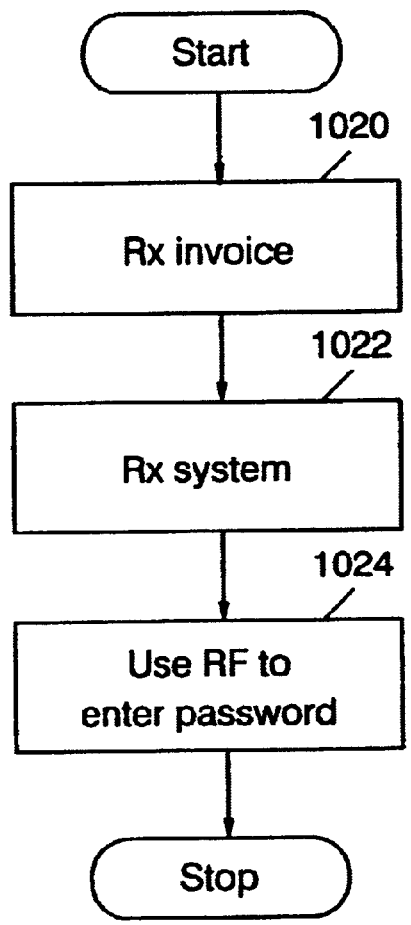
FIGS. 6 and 7 illustrate block flow diagrams of processes for enabling the secured computer system at a receiving site.
Figure 7:
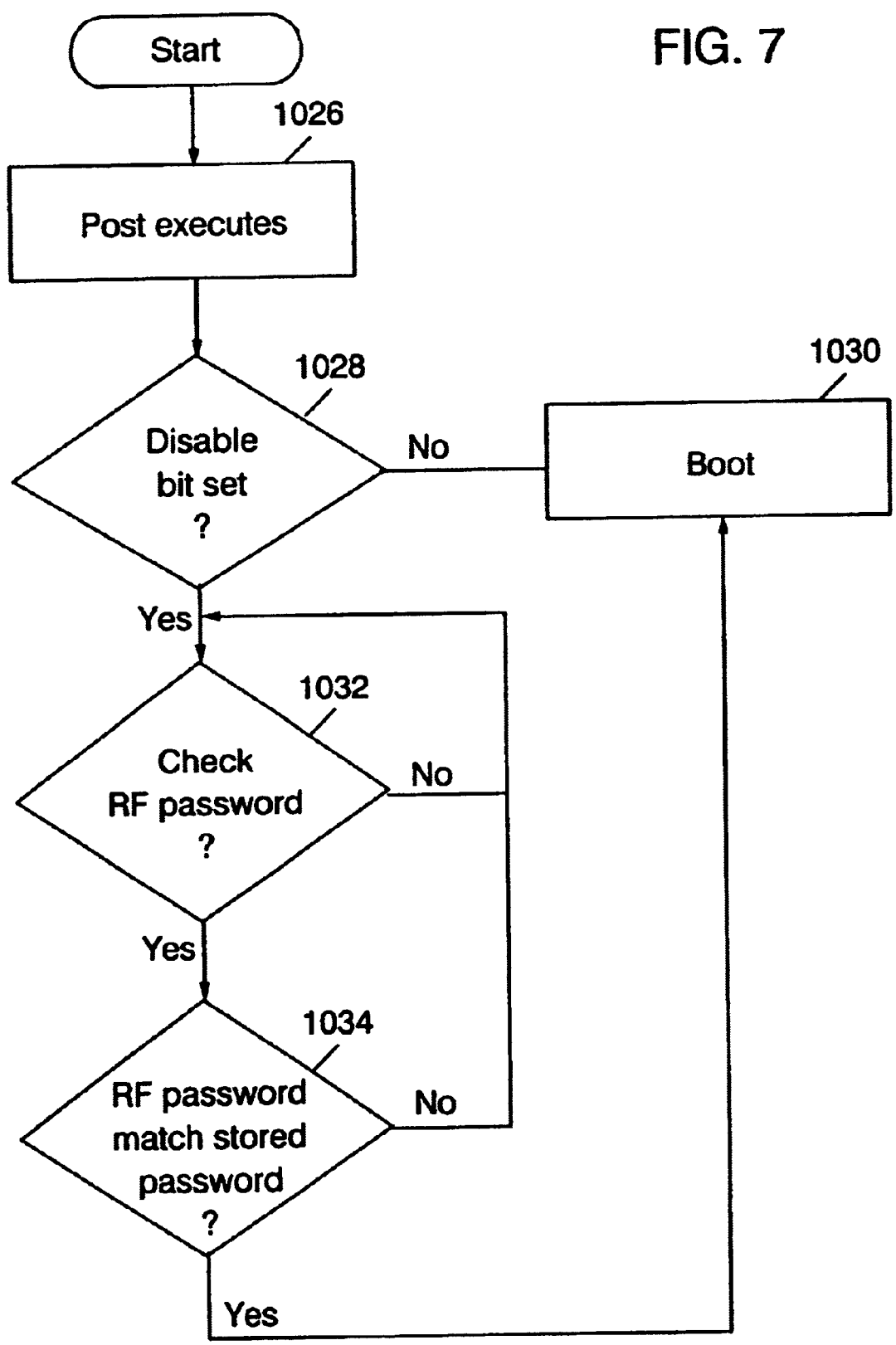

In accordance with the present invention, a computer system 30 is securely transferred between a shipping site and a receiving site by utilizing the RFID interface 64 in conjunction with EEPROM circuit 63 of the computer system 30, as described with reference to FIGS. 4–7. FIGS. 4 and 5 illustrate flow diagrams of processes occurring to secure a computer system at a shipping site, while FIGS. 6 and 7 illustrate flow diagrams of processes occurring upon receipt of the computer system at a receiving site.

Referring to FIG. 4, securing a computer system for transfer initiates at a shipping site by reading a universal unique identifier (UUID) from the computer system (step 1000). For example, a unique serial number stored in EEPROM 63 acts as a suitable universal unique identifier for a computer system. A boot password is then selected and assigned at the shipping site to the computer system (step 1002). The boot password is written into the EEPROM 63 of the computer system via the RF interface 64 for storing in EEPROM circuit 63 (step 1004). A signal is also sent to set a disable bit in EEPROM circuit 63 of the computer system to disable the operation of the computer system (step 1006). The UUID and password are then stored into a central database at the shipping site as a reference for the secured and disabled computer system (step 1008).

Referring now to FIG. 5, when the computer system is to be transferred from the shipping site, the computer system being transferred is pulled from the available stock (step 1010). The UUID for the computer system is read from the EEPROM circuit 63 using the RF interface (step 1012) and the computer system is shipped (step 1014). Within the central database, the computer system is identified by the UUID and marked as shipped (step 1016). An invoice for the computer system is then created that indicates the UUID and password, as stored in the central database (step 1018). The invoice is then sent to the recipient (step 1019), e.g., is electronically mailed to the customer. Alternatively, the UUID and password may be provided in a secure Internet website accessible to the recipient.

By these processes, the computer system is sent disabled with a security feature that restricts unauthorized access to the computer system. The use of the RFID interface reduces labor intensity, since the RFID interface allows wireless interaction with the system, including interaction through, the box in which the computer system is sent. Once shipped, the process of utilizing the RFID interface continues, as described with reference to FIG. 6. The recipient receives the UUID and password, e.g., from the invoice, (step 1020) and receives the computer system (step 1022). Having received the password information, the user inputs the password by signalling to the computer system via the RF interface (step 1024). The signals include the instruction to clear the disable bit, if the password-transmitted matches the stored password in EEPROM 63.

With reference to FIG. 7, from the viewpoint of the operations of the computer system, upon power-up, the POST (power on self test) executes (step 1026). The system then checks for a set disable bit in EEPROM 63 (step 1028). If the disable bit is not set, the system continues with its boot process (step 1030). If the disable bit is set, the system checks for the RF password in the EEPROM 63 (step 1032). When a password has been entered, the system determines if the input password matches the assigned password stored in the EEPROM 63 (step 1034). The system does not boot until the proper password has been entered to cause the POST to clear the associated disable bit, thus securing the system against unauthorized access. Therefore, if the system is stolen and powered on prior to reaching its intended destination, POST will find the disable bit set and prompt for the boot password. The system will not boot until the password is correctly entered. Every three unsuccessful attempts at the password disables the system, i.e., no more password prompts occur. The system is then required to be power cycled (ON-OFF-ON) to restart.

Although the present invention has been described in accordance with the embodiments shown, one of ordinary skill in the art will readily recognize that there could be variations to the embodiments and those variations would be within the spirit and scope of the present invention. For example, although the entry of the password is described through the use of the RFID interface, input may be done by manual entry, such as through the use of a keyboard. Further, although a primary environment for secure transfer has been described with reference to a transfer from a manufacturer to a customer, the principles are also applicable to other types of transfers, such as between worksites. Accordingly, many modifications may be made by one or ordinary skill in the art without departing from the spirit and scope of the appended claims.

What is claimed is:

1. A method for securely transferring computer systems, the method comprising:

disabling a computer system at a shipping point via an RFID (radio frequency identification) interface, including selecting a boot password, writing the boot password to storage in the computer system via the RFID interface, and setting a disable bit in the storage via the RFID interface; and re-enabling the computer system at a receiving point via the RFID interface.

2. The method of claim 1 wherein the storage further comprises an electrically erasable programmable read only memory (EEPROM).

3. The method of claim 1 further comprising providing the boot password from the shipping point to the receiving point.

4. The method of claim 3 wherein the boot password is provided via electronic mail.

5. The method of claim 1 wherein re-enabling the computer system further comprises entering the boot password via the RFID interface.

6. The method of claim 5 further comprising attempting to boot the computer system, comparing the entered boot password to the written boot password, and booting the computer system, including clearing the disable bit, when the entered boot password matches the written boot password.

7. A method for securely transferring computer systems, the method comprising:

providing a first signal sequence at a first site through a predetermined interface to disable operations in a computer system, including selecting a boot password, writing the boot password to storage in the computer system via an (radio frequency identification) RFID interface, and setting a disable bit in the storage via the RFID interface;

transferring the disabled computer system to a second site; and providing a second signal sequence at the second site through the predetermined interface to enable operations in the computer system.

8. The method of claim 7 wherein the step of providing a first signal sequence further comprises determining a universal unique identifier for the computer system.

9. The method of claim 8 further comprising saving the boot password in an EEPROM of the computer system.

10. The method of claim 9 wherein the step of transferring further comprises identifying the universal unique identifier from the computer system via the predetermined interface, transporting the computer system to the second site, and providing information on the universal unique identifier and boot password to the second site.

11. The method of claim 10, wherein providing information further comprises sending the information via electronic mail.

12. The method of claim 10 wherein the step of providing a second signal sequence further comprises providing the boot password.

13. A system for transferring a computer system securely, the system comprising:

a central processing system; and a radio frequency identification interface (RFID) coupled to the central processing system, the RFID for receiving a first signal sequence including a universal unique identifier, an assigned password for the computer system, and a set disable bit to disable the computer system at a shipping site and for receiving a second signal sequence including a boot password at a receiving site to enable operations of the computer system.

14. The system of claim 13 further comprising a BIOS ROM coupled to the RFID, the BIOS ROM including instructions for comparing the boot password to the assigned password, and for booting the computer system when the boot password matches the assigned boot password.

* * * * *